W. THOMAS.
GAS PRODUCER.
APPLICATION FILED JUNE 14, 1909.
966,718.
Patented Aug. 9, 1910.
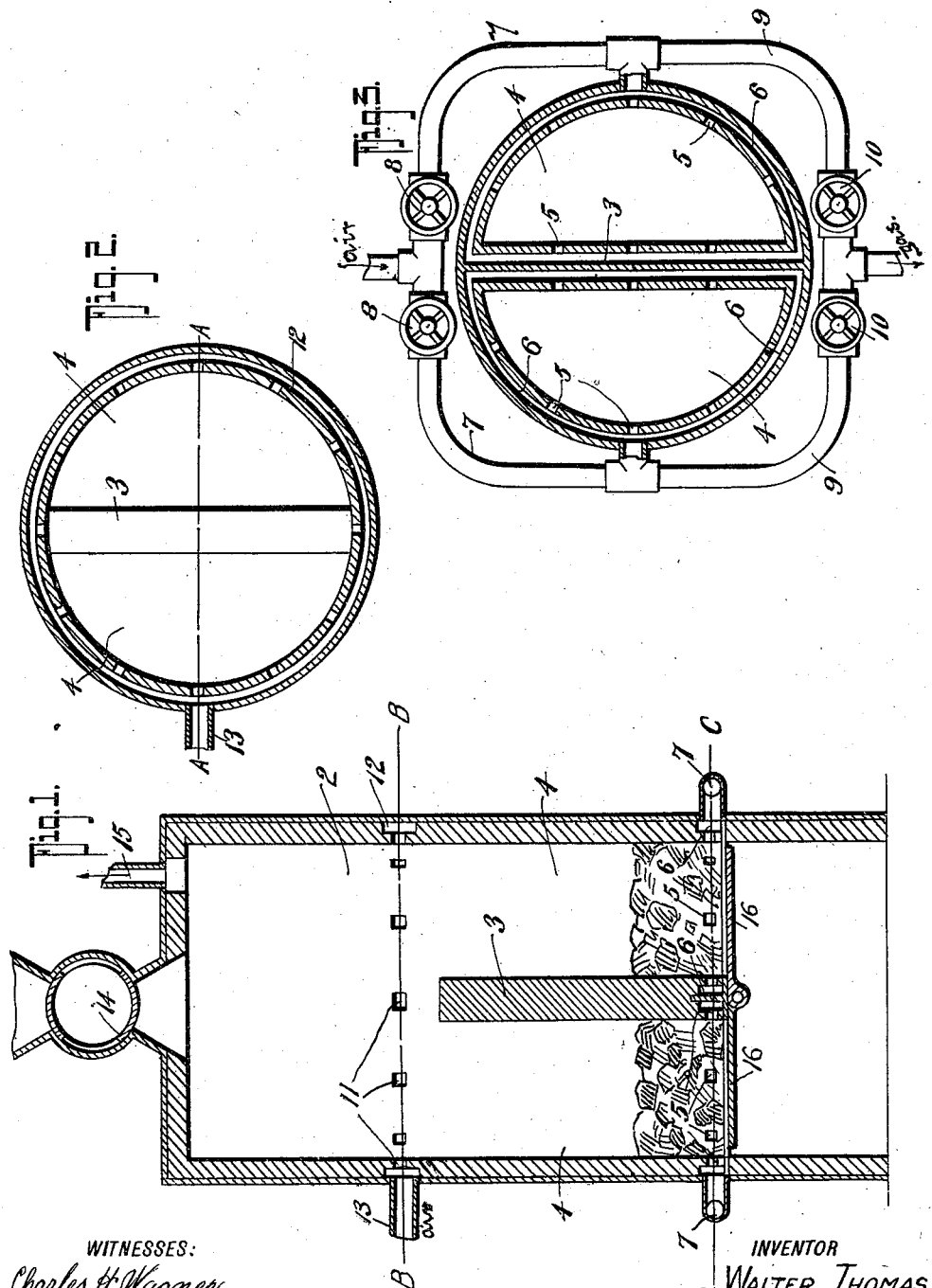
WITNESSES:
Charles H. Wagner
Haynard Woodard
INVENTOR
WALTER THOMAS
BY
Fred G. Dieterich
ATTORNEY.

UNITED STATES PATENT OFFICE.

WALTER THOMAS, OF VANCOUVER, BRITISH COLUMBIA, CANADA.

GAS-PRODUCER.

966,718.  Specification of Letters Patent.  Patented Aug. 9, 1910.

Application filed June 14, 1909. Serial No. 502,097.

*To all whom it may concern:*

Be it known that I, WALTER THOMAS, citizen of the Dominion of Canada, residing at Vancouver, in the Province of British Columbia, Canada, have invented a new and useful Improvement in Gas-Producers, of which the following is a specification.

This invention relates to a gas producer for the generation of gas for heating or power purposes, from waste material, and is designed as an adaptation of the invention, patented to me in Canada the 23rd day of June, 1908, under No. 112659, to the special requirements of the generation of gas from a waste material having a high percentage of moisture.

In the application of the invention patented as above, to generate gas from saw mill refuse it was found that the excessive moisture carried in such wood when vaporized rapidly reduced the incandescence of the fuel in the chamber through which it passed to be fixed as a gas and that enough heat was not attainable to volatilize the resins or drive out the moisture from the wood as fed into the producer. To overcome these objections I have introduced above the partition which separates the generating chambers, a second group of air admission twyers, thus producing a second zone of combustion that will maintain the fuel in the combustion chambers in an efficient state of incandescence for the generation of gas, and that will effectually dry out the wood above which is feeding down to both combustion chambers.

The invention is particularly described in the following specification, reference being made to the drawings by which it is accompanied, in which:

Figure 1 is a vertical section on the line A A in Fig. 2, Fig. 2, a sectional plan on the line B B, and Fig. 3, a similar plan on the line C C.

In these drawings 2 represents the fuel chamber the lower part of which is divided by a partition or partitions 3 into two or more gas generating chambers 4. The drawing herewith shows it in its simplest form as divided into two.

At the bottom of each generating chamber 4 are twyers 5 delivering air into the chamber from a passage 6 passing around the outer side of each and across the partition, see Fig. 3. The passage 6 of each generating chamber is separately connected by pipes 7 to a pipe delivering air under pressure and the passages 6 are also separately connected by pipes 9 to a gas delivery by which the generated gas is passed through the necessary cleansers and condensers either to a gasometer or direct to the suction of an engine. These pipe connections 7 and 9 to each generating chamber are separately provided with valves 8 and 10 that the air admission and the gas delivery may be opened or shut to one or the other at will.

Above the level of the partition 3 which separates the generating chamber, twyers 11 deliver air into the producer from an annular passage 12 to which passage air is admitted by a pipe 13 from the same source of supply that delivers to the lower twyers.

The bottom of the producer may be furnished with drop floors 16 by which the accumulation of incombustible material may be removed.

The upper end of the producer is closed and is provided with a fuel delivery means 14 through which fuel may be introduced while the producer is in use, and from the top a pipe 15 delivers the gases and vapors which are volatilized from the fuel while drying out, which gases and vapors may be condensed and the non-condensible parts returned to the air delivery by means of a pump.

In operation, the producer is fully charged with fuel and after ignition that within the generating chambers is blown into incandescence by air admitted through the twyers 5 and a second zone of incandescence approximate to the upper level of the partition 3 by air through the twyers 11. After a satisfactory condition of incandescence has been attained in both generating chambers 4, the valve 8 of the air supply to one of the chambers, say that to the right, is then closed and the gas delivery valve 10 of that chamber is opened. The air delivered into the other generating chamber, that on the left, passes upward through the incandescent fuel in that chamber and downward through that in the right, and is delivered as a fixed gas through the twyers 5 of that chamber, from which the air was cut off, and is delivered through the valve 10 to pass through the necessary scrubbers and cleansers for use. After the gas is passed in this direction for a few minutes the gas and air valves 8 and 10 are opened and closed to reverse the direction of the air and gas through the generating chambers. This continual reversal and the maintenance of constant combustion adjacent to the twyers 11 insures that the fuel in the chambers 4 is maintained as incandescent charcoal through which the air current is constrained to flow. Further, the proximity of the combustion at 11 to the fresh incoming fuel enables that fuel to be effectually dried out before it passes into the chambers 4 and the more volatile gases vaporized during the drying are delivered through the pipe 15 and condensed for the recovery of such by-products as are obtainable from them.

To cool the gas out-passing at the twyers 5 and with the heat absorbed therefrom to heat the in-passing air when the directions of the currents are reversed, a layer of about sixteen or eighteen inches of broken firebrick may be disposed in the bottom of each combustion chamber. The heating of the in-passing air for combustion and the cooling of the generated gas may be further mutually effected in a generator of approved design where the air and gas are brought into conductive contact.

Having now particularly described my invention and the manner of its use, I hereby declare that what I claim as new and desire to be protected in by Letters Patent, is:

1. In a device of the class described, a casing, a grate within said casing dividing it into an upper and a lower portion, a partition in said upper portion dividing said upper portion into a pair of generating chambers, said casing and said partition each having surrounding passages and twyers effecting communication between said passages and the interior of said generating chambers, valve controlled means for admitting air into said passages, valved controlled means for conducting gases from said passages, said passages for each of the generating chambers being separate and distinct, and means for admitting fuel through the top of said casing.

2. In a device of the class described, a casing, a grate within said casing dividing it into an upper and a lower portion, a partition in said upper portion dividing said upper portion into a pair of generating chambers, said casing and said partition each having surrounding passages and twyers effecting communication between said passages and the interior of said generating chambers, valve controlled means for admitting air into said passages, valved controlled means for conducting gases from said passages, said passages for each of the generating chambers being separate and distinct, means for admitting fuel through the top of said casing, said casing having an annular passage above said partition but close to the same and twyers effecting communication between said last named annular passage and the interior of said casing, and means for admitting air to said last named annular passage.

In testimony whereof I have signed my name to this specification in the presence of two subscribing witnesses.

WALTER THOMAS.

Witnesses:
 ROWLAND BRITTAIN,
 CLIVE S. CARMAN.